United States Patent
Williams

(10) Patent No.: US 6,413,612 B1
(45) Date of Patent: Jul. 2, 2002

(54) DETACHABLE MATCH STRIKE SURFACE

(76) Inventor: Mark Williams, 169 E. Broadway, Apt. 8, New York, NY (US) 10002

( * ) Notice: Subject to any disclaimer, the term of this patent is extended or adjusted under 35 U.S.C. 154(b) by 0 days.

(21) Appl. No.: 09/546,363

(22) Filed: Apr. 10, 2000

(51) Int. Cl.⁷ .................................. B32B 3/06
(52) U.S. Cl. ............................. 428/100; 428/99; 44/643
(58) Field of Search ...................... 428/99, 100; 44/643; 206/96, 98, 119

(56) References Cited

U.S. PATENT DOCUMENTS

| | | |
|---|---|---|
| 729,817 A | 6/1903 | Wattenberg |
| 729,818 A | 6/1903 | Wattenberg |
| 3,401,790 A * | 9/1968 | Herzog .................. 44/643 |

FOREIGN PATENT DOCUMENTS

GB          10041          of 1897

OTHER PUBLICATIONS

Denis B. Alsford; "Match Holders",Dec. 1994; pp. 2, 60, 62, 64, 75, 85, 88, 124, 140, 143–144 154: Atglen, PA.

* cited by examiner

*Primary Examiner*—Alexander S. Thomas
(74) *Attorney, Agent, or Firm*—Walter J. Tencza, Jr.

(57) ABSTRACT

An apparatus is disclosed comprising a first attachment portion fixed to a housing and a detachable match strike device comprised of a first surface having a second attachment portion and a second surface, opposite the first surface, having a match strike material. The first attachment portion may be VELCRO (Trademarked) or a VELCRO (Trademarked) portion comprised of either "hooks" or "loops". The second attachment portion may be comprised of a VELCRO (Trademarked) portion which attaches to the first attachment portion. The first attachment portion attaches to the second attachment portion to connect the detachable match strike device to the housing. The first attachment and the second attachment portions may be strips of VELCRO (Trademarked) material. The housing may be a matchbox. The housing may be a circular receptacle, and the first attachment portion and the second attachment portions may be circular. The detachable match strike device may be comprised of a backing material to which the second attachment portion and the match strike material are fixed.

4 Claims, 4 Drawing Sheets

DETACHABLE MATCH STRIKE SURFACE

FIELD OF THE INVENTION

This invention relates to matches and match strike surfaces.

BACKGROUND OF THE INVENTION

U.S. Pat. No. 729,818 to Wattenberg discloses a match strike device which can be slid into a slot. (FIG. 2).

SUMMARY OF THE INVENTION

The present invention in one embodiment provides an detachable match strike surface apparatus comprised of a first attachment portion and a second attachment portion. The first attachment portion can be fixed to a housing, which may be a matchbox or match holder. The first attachment portion may have a first surface. The second attachment portion may be part of a detachable or detachable match strike device. The detachable match strike device may include a second surface having the second attachment portion and an opposing third surface including a match strike material. The first surface of the first attachment portion attaches to the second surface of the second attachment portion in order to attach the detachable match strike device to the housing.

The first attachment portion and the second attachment portion may be comprised of mating VELCRO (Trademarked) portions. The term VELCRO may or may not be a trademarked term or it may or may not at this time be a generic term. For example, the first attachment portion may be comprised of "loops" while the second attachment portion is comprised of "hooks" or the first attachment portion may be comprised of "hooks" while the second is comprised of "loops". The two attachment portions may be strips of VELCRO (Trademarked) material. The housing may be a circular, rectilinear receptacle, asymetric receptacle, rhomboidal, spheroidal, or circumferential receptacle. The first attachment portion and the second attachment portions may have a shape similar to the housing. The detachable match strike device may be comprised of a backing material to which the second attachment portion and the match strike material are fixed. VELCRO (Trademarked) is also known as "hook and loop fastener" or "hook and loop fastening system."

The first attachment portion and the second attachment portion may also each be comprised of arrowhead fasteners or mushroom fasteners.

DETAILED DESCRIPTION OF THE DRAWINGS

Figure 1:
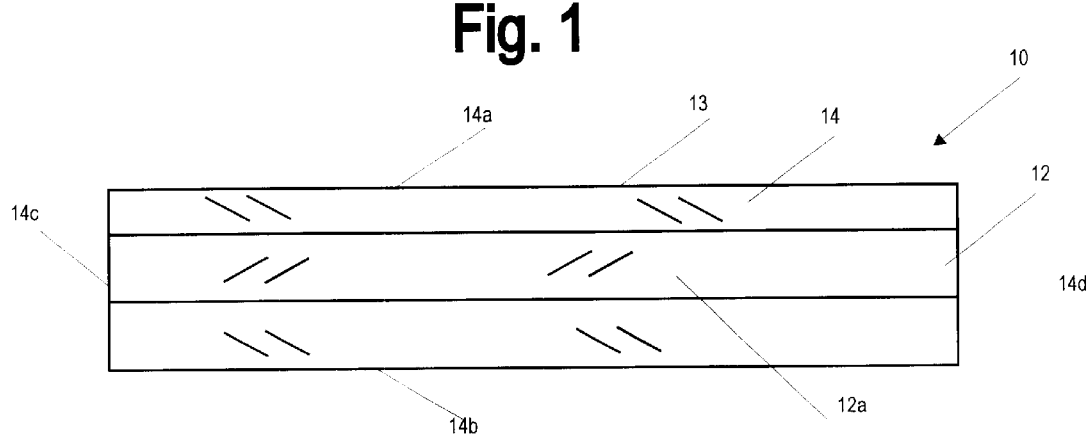
FIG. 1 shows a side view of a matchbox with a strip of VELCRO (Trademarked) in accordance with an embodiment of the present invention.

FIG. 1 shows a side view of a matchbox with a strip of VELCRO (Trademarked) 10 in accordance with an embodiment of the present invention. The matchbox with strip of VELCRO (Trademarked) 10 includes a matchbox 14 and a strip of VELCRO (Trademarked) 12. The matchbox 14 has a face 13 which is rectangular and has sides 14$a$, 14$b$, 14$c$, and 14$d$. The strip of VELCRO (Trademarked) 12 may be "hooks" or "loops". Thus the strip of VELCRO (Trademarked) may actually be only a portion of a VELCRO (Trademarked) system. The strip of VELCRO (Trademarked) may extend the length of the matchbox 14 from side 14$c$ to 14$d$. The strip 12 can be thought of as a first attachment portion.

Figure 2:
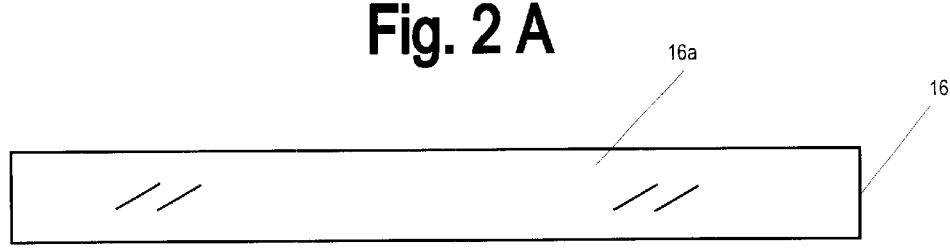
FIG. 2A shows a first side view of a strip, the side shown in FIG. 2A has VELCRO (Trademarked) on it.
FIG. 2B shows a second side view of the strip of FIG. 2A, the side shown in FIG. 2B has a match strike surface material on it.
Figure 2:
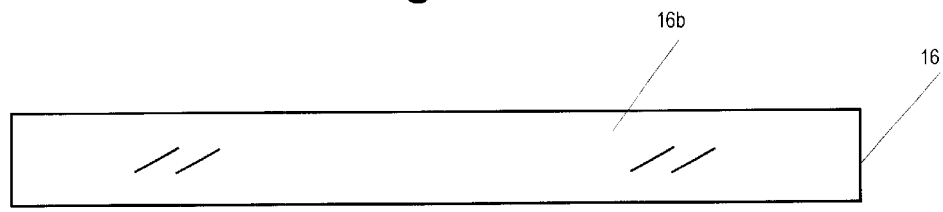

FIG. 2A shows a first side 16$a$ view of a strip 16, the side 16$a$ has VELCRO (Trademarked) on it. If the strip of VELCRO (Trademarked) 12 on the matchbox with VELCRO (Trademarked) 10 is "hooks" then the side 16$a$ should be "loops". In this manner the side 16$a$ can be attached to the strip 12 on the matchbox 14. Alternatively the strip 12 may be "loops" and the side 16$a$ may be "hooks". FIG. 2B shows a second side 16$b$ of the strip 16 of FIG. 2A, the side 16$b$ has a match strike surface material on it. This material may be comprised of red phosphorous (52%), antimony sulphide (27%), glass powder (8%), gum arabic (12.6%), and gum tragacanth (0.4%). The strike surface material may be in any composition suitable for a match strike surface, such as disclosed in "Matchmaking: Science. Technology and Manufacture" C. A. Finch, John Wiley and Sons, which is incorporated by reference herein. The side 16$a$ of the strip 16 can be thought of as a second attachment portion and the strip 16 can be thought of as a detachable match strike surface device.

Figure 3:
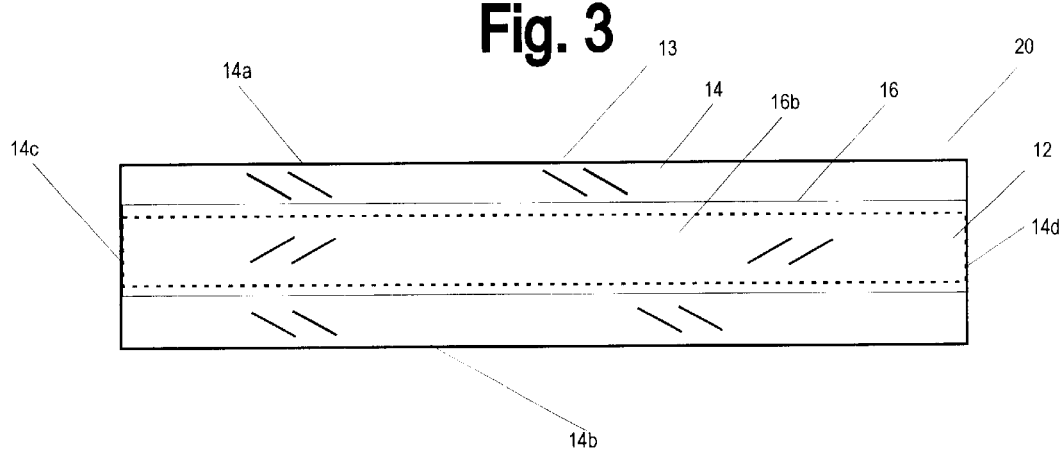
FIG. 3 shows the matchbox of FIG. 1 with the strip of FIGS. 2A and 2B attached to it.

FIG. 3 shows the matchbox with VELCRO (Trademarked) 10 of FIG. 1 with the strip of FIGS. 2A and 2B attached to it. The strip 12 is shown in dashed lines because it would be underneath the strip 16 and thus couldn't normally be seen. The strip 16 is shown larger than the strip 12 only for description purposes (so that both strips can be identified), however strip 16 and strip 12 may be about the same size. The strip 16 is placed over the strip 12 so that the "hooks" (or "loops") of side 16$a$ of the strip 16 attach to the "loops" (or "hooks") of the strip 12.

Because a VELCRO (Trademarked) or hook and loop fastener system is used, the strip 16 can be easily detached and replaced by another similar strip. This is advantageous because strike surfaces for matches (such as surface 16$b$) tend to wear out with use. Some matchholders, like matchbox 14 are valuable and one would not want to throw out the entire matcholder when the strike surface (16$b$) wore out. One of the advantages of the present invention is that it allows one to replace a strike surface without discarding the match holder.

Figure 4:
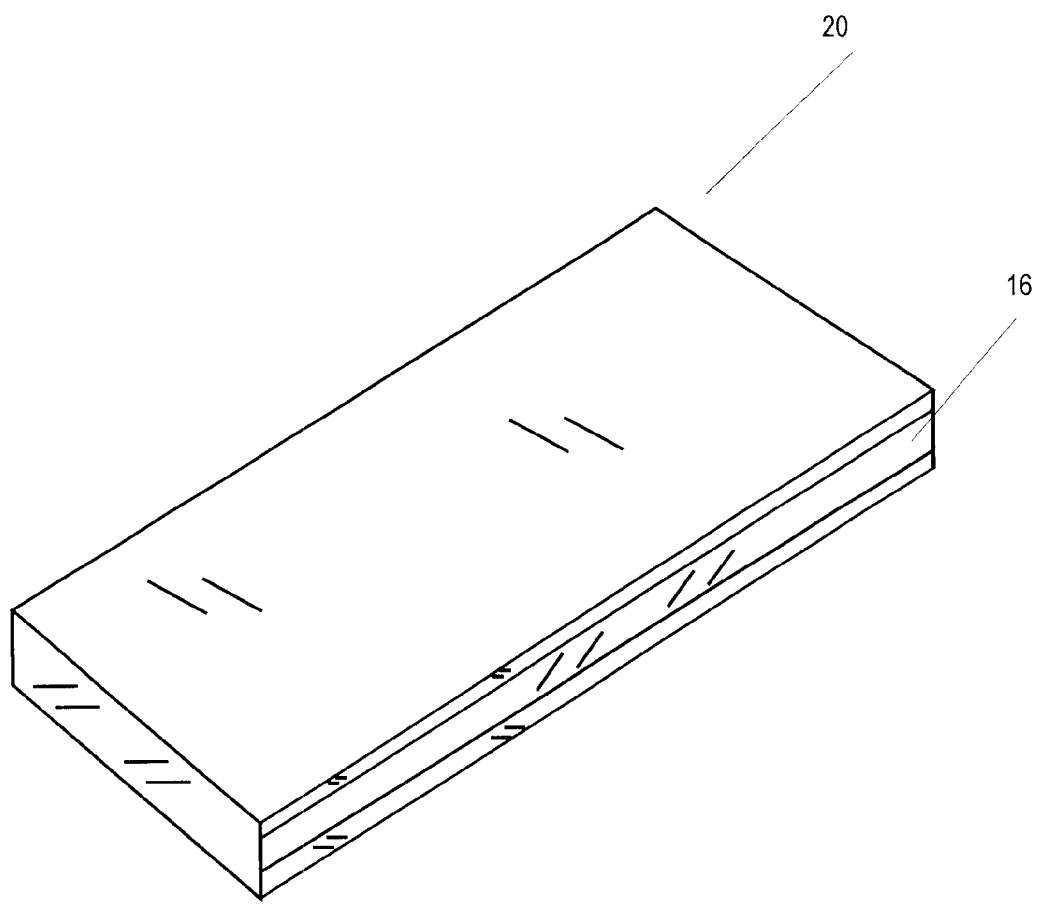
FIG. 4 shows a perspective view of the matchbox of the combination of FIG. 3.

FIG. 4 shows a perspective view of the matchbox of the combination 20 of FIG. 3 with the strike surface strip 16 attached.

The strip 16 in addition to being comprised of the surface 16a which has VELCRO (trademarked) (or a VELCRO (trademarked) portion, i.e. "loops" or "hooks") and the surface 16b which is a match strike surface may also have a layer not shown between surface 16a and 16b which acts as a backing or a stiffener. For example the surface 16a material may be placed on a cardboard backing and the surface 16b material may be placed on the other side of the cardboard backing, similar to what will be described in the embodiment of FIG. 8.

Figure 5:
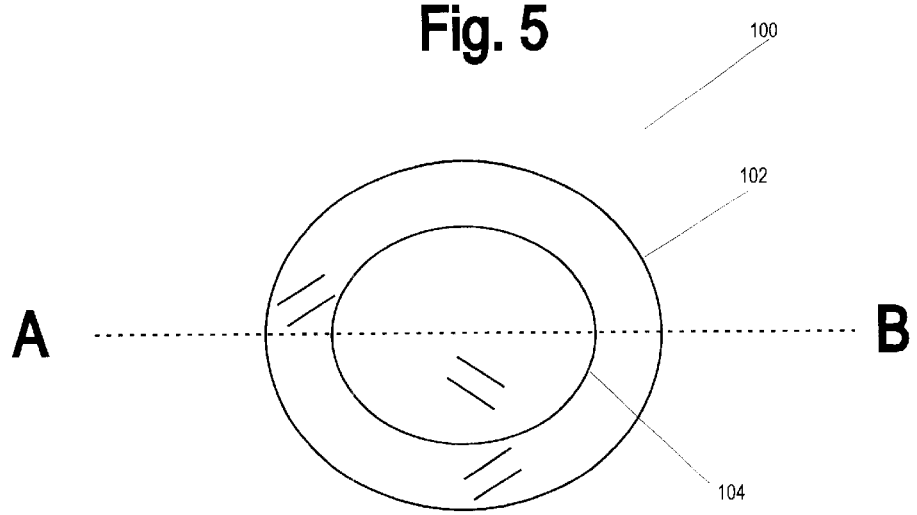
FIG. 5 shows a top view of a receptacle with a circular VELCRO (Trademarked) portion.

FIG. 5 shows a top view of a receptacle with a circular VELCRO (trademarked) (or hook and loop) portion apparatus 100. The apparatus 100 includes a receptacle 102 and a VELCRO (trademarked) portion 104. The VELCRO (trademarked) portion 104 may be comprised of "hooks" or "loops".

Figure 6:
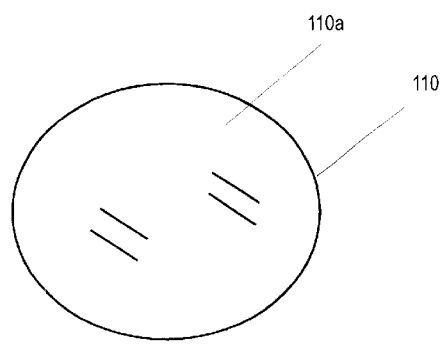
FIG. 6 shows a top view of a circular VELCRO (Trademarked) portion for attaching to the receptacle of FIG. 5.

FIG. 6 shows a top view of a circular VELCRO (trademarked) portion 110 for attaching to the apparatus 100 of FIG. 5. The circular portion 110 includes a top surface 110a which includes VELCRO (trademarked), i.e. either "hooks" or "loops". If the VELCRO (Trademarked) portion 104 on the receptacle 102 has "hooks", the circular portion 110 should contain "loops". If the VELCRO (Trademarked) portion 104 on the receptacle 102 has "loops", then the circular portion 110 should contain "hooks".

Figure 7:
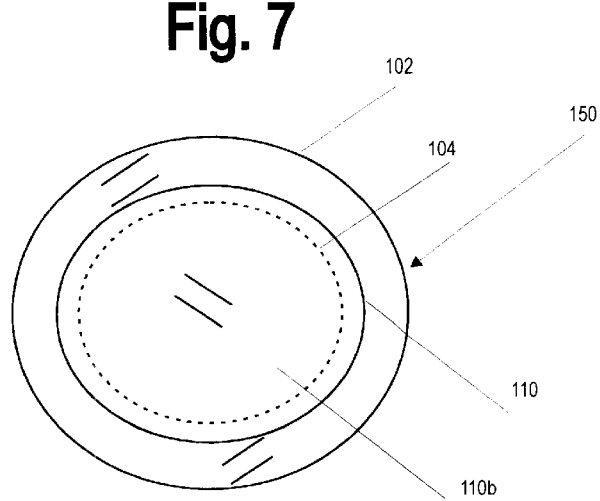
FIG. 7 shows a top view of the circular VELCRO (Trademarked) portion attached to the receptacle of FIG. 5.

FIG. 7 shows a top view of the circular VELCRO (Trademarked) portion 110 attached to the VELCRO (Trademarked) portion 104 of the receptacle 102. The circular portion 110 includes a strike surface 110b which may be comprised of red phosphorous (52%), antimony sulphide (27%), glass powder (8%), gum arabic (12.6%), and gum tragacanth (0.4%) or any other strike surface composition as previously discussed with reference to prior figures.

Figure 8:
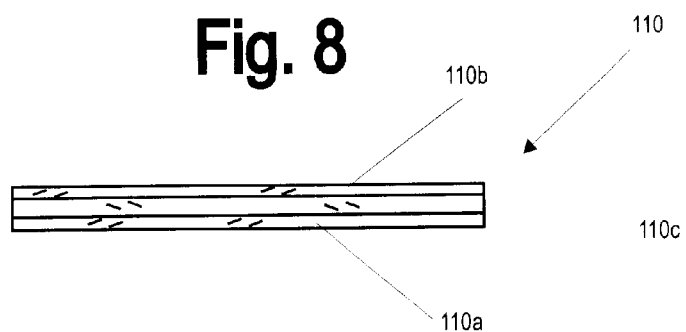
FIG. 8 shows a cross sectional view of the circular VELCRO (Trademarked) portion of FIG. 6.

FIG. 8 shows a cross sectional view of the circular VELCRO (Trademarked) portion 110 of FIG. 6. The circular VELCRO (Trademarked) portion 110 includes layer 110a, 110c and 110b. Surface layer 110a would be VELCRO (Trademarked), surface layer 110b would be a match strike surface and layer 110c would be a backing, such as cardboard.

Figure 9:
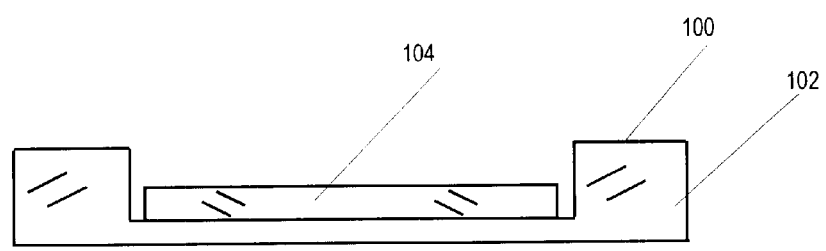
FIG. 9 shows a cross sectional view of the receptacle with circular VELCRO (Trademarked) portion of FIG. 5.
Figure 10:
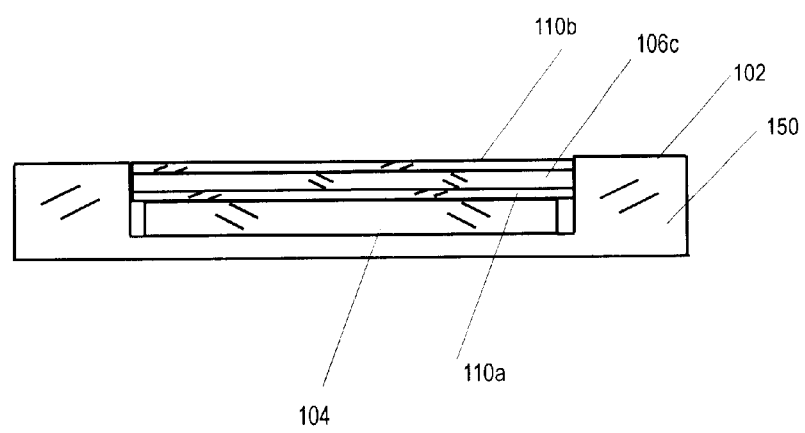
FIG. 10 shows a cross sectional view of the circular VELCRO (Trademarked) portion of FIG. 8 attached to the receptacle with circular portion of FIG. 9.

FIG. 9 shows a cross sectional view of the combination apparatus 100 of FIG. 5. FIG. 10 shows a cross sectional view of the circular VELCRO (Trademarked) portion 110 of FIG. 8 attached to the apparatus of FIG. 9. The circular portion 110 is shown slightly larger than the circular VELCRO (Trademarked) portion 104, however the two circular portions may be about the same size.

The receptacle 102 can be thought of as a housing for the VELCRO (Trademarked) portion 104 and the matchbox or matchholder 14 can be thought of as a housing for the VELCRO (Trademarked) portion 12. The strip 16 or the circular portion 110 can be thought of as a match strike devices.

Instead of the circular portion 110 a rectilinear shaped portion, an asymetrical portion, a rhomboidal portion, a spheriodal portion, or a circumferential portion may be provided. Other external/internal geometries are possible.

I claim:

1. An apparatus comprising:

a first attachment portion fixed to a housing, the first attachment portion having a first surface;

a detachable match strike device comprised of a second surface having a second attachment portion and a third surface, opposite the second surface, having a match strike material;

wherein the first surface of the first attachment portion of the housing attaches to the second surface of the second attachment portion in order to attach the detachable match strike device to the housing;

wherein the first attachment portion is comprised of a first portion of a hook and loop system;

the second attachment portion is comprised of a second portion of a hook and loop system; and the first portion of the first attachment portion attaches to the second portion of the second attachment portion to connect the detachable match strike device to the housing.

2. The apparatus of claim 1 wherein the first attachment portion is a strip of a first portion of a hook and loop system; and the second attachment portion is a strip of a second portion of a hook and loop system.

3. The apparatus of claim 2 wherein the detachable match strike device is comprised of a backing material to which the second attachment portion and the match strike material are fixed.

4. The apparatus of claim 1 wherein the detachable match strike device is comprised of a backing material to which the second attachment portion and the match strike material are fixed.

* * * * *